United States Patent Office 3,410,706
Patented Nov. 12, 1968

3,410,706
INHIBITING THERMAL DECOMPOSITION OF ALKALI METAL SILICATES
Cletus E. Peeler, Jr., Painesville, Ohio, assignor to Diamond Shamrock Corporation, a corporation of Delaware
No Drawing. Filed Oct. 8, 1964, Ser. No. 402,607
2 Claims. (Cl. 106—74)

ABSTRACT OF THE DISCLOSURE

The thermal degradation of aqueous alkali metal silicate solutions is inhibited by the addition of small amounts, generally, 0.01 to 2.0%, of zinc oxide.

---

This invention relates to the inhibition of decomposition of silicates.

Liquid silicates, especially liquid alkali metal silicates, and notably aqueous alkali metal silicates such as sodium silicate solutions, are well known and widely used commercial chemicals. The uses to which such silicate solutions are put are diverse and the problems encountered in the preparation and maintenance of such solutions also very widely with the end use intended. Despite many advantages, in some applications problems are encountered because of decomposition of the silicate, especially where the silicate is exposed to an elevated temperature in use or storage. This decomposition, often occurring over an extended period of time, although accelerated by exposure to elevated temperatures, tends disadvantageously to alter the composition of the silicate.

For example, one of the advantageous uses of liquid silicates, especially aqueous sodium silicate solutions, is as metal impregnants for the reduction or elimination of porosity in castings. Castings often contain a considerable amount of localized tiny labyrinthine voids arising from the escape of entrapped gases within the metal while it is still relatively fluid and also caused at times by shrinkage of the metal during cooling. There results what can be characterized as a liquid permeable interlaced sponge-like pore network. Such porosity while generally not impairing the structural soundness of a casting does in some instances cause undesirable porosity of the finished article. It is known that liquid silicates used as impregnants provide means for sealing off this porosity. In many instances this can be accomplished simply by dipping the metal article into a liquid silicate, such as an aqueous sodium silicate. In other cases, the metal articles are subjected to more involved treatment steps including exposure to vacuum and pressure during impregnation. In practice, the liquid silicates typically contain small amounts of clay, powdered asbestos and/or metal oxides. In some instances, dilution and/or wetting agents and peptizing agents are employed to facilitate penetration of the silicate. The use of various types of metal impregnants is disclosed in Precision Metal Molding, Sept. 1953, p. 114.

In use, it has been found that despite the advantages provided by the use of liquid silicates in this manner, some practical problems arise because the liquid silicates, especially aqueous alkali metal silicates, tend to decompose, in time, especially when subjected to elevated temperatures. While the complete mechanism of this decomposition is not understood, it is believed that in the case of sodium silicates the decomposition involves formation of a hard layer or other undesirable precipitate of sodium tetrasilicate or related polysilicates.

Accordingly, a principal object of this invention is to avoid the difficulties heretofore encountered with decomposition of silicates, especially those used as metal impregnants.

A still further object of the invention is to provide a new method for inhibiting thermal decomposition of liquid silicates.

These and other objects and advantages of the invention will appear more fully hereinafter.

Broadly stated, the present invention involves adding a small but effective amount of zinc oxide to a silicate, thereby to inhibit decomposition, which decomposition typically is evidenced by increasing turbidity and subsequent formation of an undesirable precipitate in the silicate.

More particularly, the present invention comprises the addition to a silicate of a decomposition inhibiting amount of zinc oxide. In general, the amount of zinc oxide to be added may vary from about 0.01% to about 2% by weight of the silicate, although in some applications even larger amounts, such as up to 20% by weight can be used to inhibit decomposition. However, in most instances there is usually no particular advantage insofar as inhibiting decomposition is concerned in using larger amounts. It is presently preferred to add zinc oxide to the silicate in an amount within the range of about 0.4% to 0.6% by weight of the liquid silicate, to an alkali metal silicate, preferably a liquid sodium silicate having an $SiO_2:Na_2O$ weight ratio of at least 2.2:1, although the invention contemplates that the zinc oxide can be added to a dry silicate such as a commercially available hydrated silicate. In general, the stabilizing effect of this invention is obtained both in concentrated commercially available liquid silicates as well as further diluted silicates.

The term "silicate" as used in the specification and claims is intended to include various water soluble silicates including both alkali metal silicates and ammonium silicate. Further, the expression "alkali metal silicates" is intended to refer to water soluble silicates of the various alkali metals, i.e., sodium, potassium, lithium, rubidium and cesium; it will be understood, of course, that sodium silicates and potassium silicates are the more readily available alkali metal silicates and that sodium silicate generally constitutes the common commercial alkali metal silicate. For this reason, particular emphasis hereinafter is given to this material which constitutes a preferred alkali metal silicate.

The liquid portion of the liquid silicate generally and most advantageously is water. In practice, the liquid silicate used can be a commercially available aqueous silicate, typically containing about 45% to 70% by weight water. However, if desired, the zinc oxide can also be added to a dry silicate prior to mixing with water, thus forming a composition embodying the invention.

A particularly preferred metal impregnant composition of this invention is prepared by combining sodium silicate having an $SiO_2:Na_2O$ weight ratio of at least 2.2:1, and generally up to 4.0:1 which silicate otherwise is subject to decomposition, especially thermal decomposition, and about 0.4% to 0.6% by weight of the liquid silicate of zinc oxide having a particle size of less than 200 mesh, preferably less than 400 mesh. In general, the smaller the particle size of the zinc oxide, the better.

In the practice of this invention, various commercially available aqueous sodium silicates can be employed. By way of example, the following, with indicated $SiO_2:Na_2O$ ratios, are available commercially.

TABLE 1

| Silicate No. | Percent Na₂O | Percent SiO₂ | Percent H₂O | SiO₂:Na₂O, Wt. Ratio | Gravity, °Bé'. |
|---|---|---|---|---|---|
| 1 | 14.7 | 29.4 | 55.9 | 2.00 | 50.0 |
| 2 | 13.9 | 33.4 | 52.7 | 2.40 | 52.0 |
| 3 | 10.6 | 26.9 | 62.5 | 2.54 | 42.0 |
| 4 | 12.4 | 32.1 | 55.5 | 2.58 | 49.0 |
| 5 | 11.2 | 31.9 | 56.9 | 2.84 | 47.0 |
| 6 | 9.1 | 29.2 | 61.7 | 3.22 | 41.5 |
| 7 | 9.3 | 30.0 | 60.7 | 3.22 | 42.5 |
| 8 | 8.8 | 29.1 | 62.1 | 3.30 | 41.0 |
| 9 | 6.7 | 25.3 | 67.9 | 3.75 | 35.0 |
| 10* | 19.4 | 62.5 | 17.5 | 3.22 | |
| 11* | 27.5 | 55.0 | 17.5 | 2.00 | |

*– Dry silicate.

A specifically preferred composition of this invention is 71.3% sodium silicate with a SiO₂:Na₂O wt. ratio of 2.84:1 (silicate number 5 from Table 1), 0.5% zinc oxide, and 28.2% added water to give a total solids content of 31.2%.

In order that those skilled in the art may more completely understand the present invention and the preferred methods by which the same may be carried into effect, the following specific examples are offered:

EXAMPLE 1

500 gms. each of silicates 1, 2 and 5 from Table No. 1 plus a special silicate prepared by mixing 250 gms. each of silicates 1 and 2 are split into two portions of 250 gms. each. Each portion is placed in a ½ pt. metal can and to each can is added 80 gms. of water. This gives a specific gravity of 1.32 which approximates that used in metal sealant compositions. After stirring thoroughly, approximately 80 gms. is discarded from each can and 1 gm. of powdered ZnO is added to one can of each grade silicate with thorough stirring. The 8 samples (4 with ZnO and 4 controls) are sealed and placed in an oven maintained at 120° to 130° F. for thermal decomposition studies. The samples are observed at intervals of 48 hours, 5 days, 2 weeks, 1 month, 6 weeks, 19 weeks, 28 weeks and 45 weeks. Since the only change noticed at the 48 hour and 5 day points is the formation of a small layer of undissolved ZnO, the samples are remixed after these two examinations prior to resealing and replacing in the oven. At all other examination points the contents are not disturbed more than is required to evaluate any deposits.

At 6 weeks the samples of silicate No. 2 and No. 5 that do not have ZnO added begin to show a tendency to decompose. At 19 weeks breakdown of these 2 samples is definite with no significant change in the other 6 samples. At 28 weeks a large amount of breakdown is observed with almost ½ of silicate No. 2 solidified. There is still no change in the other samples.

When a final observation is made at 45 weeks the following is noted.

| SiO₂:Na₂O, Wt. Ratio | See Table 1 Silicate No. | Percent ZnO | |
|---|---|---|---|
| 2.0:1 | 1 | | No break down—Trace of sediment. |
| 2.0:1 | 1 plus ZnO | 0.4 | No break down—Less sediment than above. |
| 2.2:1 | Special silicate | | No break down—Trace of sediment. |
| 2.2:1 | Special silicate plus ZnO. | 0.4 | No break down—Less sediment than above. |
| 2.4:1 | Silicate 2 | | Complete break down—Sample solid. |
| 2.4:1 | 2 plus ZnO | 0.4 | Small hard deposit |
| 2.8:1 | Silicate 5 | | Definite decomposition—one-half solid. |
| 2.84:1 | 5 plus ZnO | 0.4 | Very little break down—No hard deposit. |

From this it can be concluded that sodium silicates having SiO₂:Na₂O weight ratios of 2.2:1 or less show no breakdown and that ZnO definitely inhibits breakdown of the higher ratio silicates.

Example 2

The following test is run for 3 purposes: (A) to determine stabilization effect on undiluted commercial aqueous sodium silicates, (B) to determine the amount of ZnO necessary to effect stabilization, and (C) to test the effect of high dispersion of ZnO vs. hand mixing.

Two slurries are prepared as follows:

(A) Silicate No. 7 (See table 1) 992 gms. and 8 gms. of ZnO are thoroughly mixed (15 minutes high shear mixer).

(B) Silicate No. 5 (See table 1) 992 gms. and 8 gms. of ZnO are thoroughly mixed. Eighteen samples are prepared for testing by mixing in 8 oz. steel cans as indicated in the table below. This amount of material in the 8 oz. cans used gives a 1¾" depth of silicate solution in the can.

| Sample | Wt. (gms.) Silicate No. 7 (Untreated) | Wt. gms. Slurry A | Percent ZnO | Wt. (gms.) Silicate No. 5 (untreated) | Wt. (gms.) Slurry B |
|---|---|---|---|---|---|
| 1A | 250 | 0 | 0 | | |
| 2A | 243.7 | 6.3 | 0.02 | | |
| 3A | 234.4 | 15.6 | 0.05 | | |
| 4A | 218.7 | 31.3 | 0.10 | | |
| 5A | 187.5 | 62.5 | 0.2 | | |
| 6A | 125.0 | 125 | 0.4 | | |
| 7A | 62.5 | 187.5 | 0.6 | | |
| 8A | 249.0 | 1.0 | 0.0032 | | |
| 9A | ¹250 | 0 | ¹0.2 | | |
| 1B | | | 0 | 250 | 0 |
| 2B | | | 0.02 | 243.7 | 6.3 |
| 3B | | | 0.05 | 234.4 | 15.6 |
| 4B | | | 0.1 | 218.7 | 31.3 |
| 5B | | | 0.2 | 187.5 | 62.5 |
| 6B | | | 0.4 | 125.0 | 125 |
| 7B | | | 0.6 | 62.5 | 187.5 |
| 8B | | | 0.0032 | 249.0 | 1.0 |
| 9B | | | ¹0.2 | ¹250 | 0 |

¹ 0.5 gm. of ZnO added by hand mixing.

The samples are hand mixed, sealed, and placed in an oven at 80° C. for thermal decomposition observations.

When the samples are observed after 7 days storage at 80° C. there is no change to be noted visually. The samples remain slightly turbid due to suspended, undissolved ZnO.

By 5 weeks the breakdown has begun and at 5, 6½ and 9 weeks it is determined and reported as follows:

[Percent breakdown—height solid/total ht. (1¾")x100]

| Sample | 5 weeks | 6½ weeks | 9 weeks |
|---|---|---|---|
| 1A | 33% | 33% | Discontinued. |
| 2A | 33% | 50% | Do. |
| 3A | 75% | 100% | Do. |
| 4A | 75% | 100% | Do. |
| 5A | 50% | 75% | Do. |
| 6A | Trace | None | Do. |
| 7A | do | do | Do. |
| 8A | 25% | 33% | Do. |
| 9A | 33% | 50% | Do. |
| 1B | Trace | 33% | 43%. |
| 2B | do | 33% | 43%. |
| 3B | do | 33% | 32%. |
| 4B | do | 33% | 29%. |
| 5B | do | 33% | 29%. |
| 6B | None | None | None. |
| 7B | do | do | Do. |
| 8B | Trace | 33% | 21%. |
| 9B | do | 33% | 29%. |

From this table it can be determined that the most effective amounts of ZnO are from 0.4 to 0.6%. No significant advantage appears from the use of high speed dispersion of the ZnO-silicate mixture.

It is to be understood that although the invention has been described with specific reference to particular embodiments thereof, it is not to be so limited, since changes and alterations therein may be made which are within the full intended scope of this invention as defined by the appended claims.

What is claimed is:

1. The method of inhibiting thermal decomposition of an aqueous alkali metal silicate solution having a silicon dioxide to alkali metal oxide weight ratio of at least 2.2:1.0, which method consists of adding, with mixing, to said silicate solution from 0.4–2.0 percent by weight of the silicate solution of zinc oxide.

2. The method of claim 1 wherein the silicate is an aqueous sodium silicate.

References Cited

UNITED STATES PATENTS

| | | | |
|---|---|---|---|
| 1,923,769 | 8/1933 | Wood | 106—84 |
| 2,111,131 | 3/1938 | Weygandt | 106—84 |
| 2,311,271 | 2/1943 | Ware | 106—84 |
| 2,536,871 | 1/1951 | Carlton | 106—84 |
| 2,680,081 | 6/1954 | Probert et al. | 106—74 |
| 2,998,328 | 8/1961 | Munger et al. | 106—84 |
| 3,093,493 | 6/1963 | Freyhold | 106—74 |
| 3,100,154 | 8/1963 | Oshima et al. | 106—84 |
| 3,146,828 | 9/1964 | Mann | 106—84 |

TOBIAS E. LEVOW, *Primary Examiner.*

S. E. MOTT, *Assistant Examiner.*